US010461483B2

(12) United States Patent
Gellert et al.

(10) Patent No.: US 10,461,483 B2
(45) Date of Patent: Oct. 29, 2019

(54) STRUT END CONDITION, END BLOCK, AND CONNECTOR

(71) Applicant: Architectural busSTRUT Corporation, Worthington, OH (US)

(72) Inventors: Larry Gellert, New Albany, OH (US); Greg Gellert, Columbus, OH (US); Denver Clark, Columbus, OH (US); Daryl Van Mercetta, Columbus, OH (US)

(73) Assignee: ARCHITECTURAL BUSSTRUT CORPORATION, Worthington, OH (US)

( * ) Notice: Subject to any disclaimer, the term of this patent is extended or adjusted under 35 U.S.C. 154(b) by 0 days.

(21) Appl. No.: 15/803,745

(22) Filed: Nov. 4, 2017

(65) Prior Publication Data
US 2019/0140408 A1    May 9, 2019

(51) Int. Cl.
*H01R 25/16* (2006.01)
*H01R 13/512* (2006.01)
(Continued)

(52) U.S. Cl.
CPC ......... *H01R 25/162* (2013.01); *H01R 13/512* (2013.01); *H01R 13/62916* (2013.01); *H02G 5/00* (2013.01)

(58) Field of Classification Search
CPC .... H01R 25/145; H01R 25/162; H01R 25/14; H01R 25/142; H01R 13/62916; H01R 13/62922
(Continued)

(56) References Cited

U.S. PATENT DOCUMENTS

| 2,150,963 A | 3/1939 | De Mask |
| 2,317,964 A * | 4/1943 | O'Brien ............... H01R 25/162 |
| | | 174/101 |

(Continued)

FOREIGN PATENT DOCUMENTS

| CN | 104184091 A | 12/2014 |
| EP | 2403086 A1 | 1/2012 |

(Continued)

OTHER PUBLICATIONS

"ADK421—Erico ADK Strut End Cap" (abstract). Leo J. Mahoney Co. [online], [retrieved on Aug. 27, 2017] using Internet URL: <http://www.mahoneyco.com/ADK421_1.html>.
(Continued)

*Primary Examiner* — Harshad C Patel
(74) *Attorney, Agent, or Firm* — Benesch, Friedlander, Coplan & Aronoff LLP

(57) ABSTRACT

Various embodiments of a strut end condition, end block, and connector are disclosed. In one embodiment, a system including a series of strut assemblies is provided, comprising: two strut assemblies oriented end-to-end, each including: a strut; an insulator; at least one conductor wire; and an end block oriented within an end of the strut, the end block nesting within the strut; a connector spanning a junction created by adjacent ends of the two strut assemblies, the connector including: an upper housing having at least conductor element having vertical elements at opposing ends; a lower housing, the lower housing including: two lower housing wings, and rotatable locking cams oriented on each of the lower housing wings, the rotatable locking cams having two opposing flat sides and two opposing rounded ends; wherein the locking cams are rotatable to engage the connector with each of the two strut assemblies.

19 Claims, 15 Drawing Sheets

(51) Int. Cl.
*H01R 13/629* (2006.01)
*H02G 5/00* (2006.01)

(58) Field of Classification Search
USPC .......................................... 439/115, 121, 213
See application file for complete search history.

(56) References Cited

U.S. PATENT DOCUMENTS

| | | | | |
|---|---|---|---|---|
| 2,441,461 A * | 5/1948 | Wayne | ................... | H01R 25/14 174/535 |
| 2,572,218 A | 10/1951 | Turton | | |
| 2,675,434 A | 4/1954 | Herrmann | | |
| 3,263,131 A | 7/1966 | Rowe | | |
| 3,622,938 A * | 11/1971 | Ito | ....................... | H01R 25/145 439/115 |
| 3,628,097 A | 12/1971 | Kobryner | | |
| 3,649,951 A * | 3/1972 | Routh | ................... | H01R 25/14 439/117 |
| 3,795,886 A * | 3/1974 | Hart | ..................... | H01R 25/14 439/115 |
| 3,801,751 A | 4/1974 | Ross, Jr. | | |
| 3,836,936 A * | 9/1974 | Clement | ............... | H01R 25/14 174/481 |
| 3,900,240 A * | 8/1975 | Bertrams | ............. | H01R 25/142 439/139 |
| 4,053,194 A * | 10/1977 | Gilman | ................ | H01R 25/145 439/115 |
| 4,105,099 A * | 8/1978 | Bertrams | ................ | B60M 1/34 191/29 DM |
| 4,179,174 A | 12/1979 | Jorgensen | | |
| 4,218,108 A | 8/1980 | El Mouchi | | |
| 4,493,516 A * | 1/1985 | Attema | .................. | H01R 25/14 439/111 |
| 4,655,520 A | 4/1987 | Cummings | | |
| 4,795,355 A * | 1/1989 | Dorn | ....................... | H02G 5/04 174/495 |
| 5,092,787 A | 3/1992 | Wise et al. | | |
| 5,316,490 A * | 5/1994 | Clemence | ........... | H01R 25/161 439/113 |
| 5,582,522 A * | 12/1996 | Johnson | ............... | H01R 13/514 439/214 |
| 5,734,218 A * | 3/1998 | Crockett | ................ | H01R 39/08 29/597 |
| 5,760,339 A | 6/1998 | Faulkner et al. | | |
| 5,789,709 A | 8/1998 | Luers et al. | | |
| 6,039,584 A | 3/2000 | Ross | | |
| 6,105,741 A * | 8/2000 | Ross | ........................ | B60L 5/36 191/23 A |
| 6,176,711 B1 | 1/2001 | Rohr et al. | | |
| 6,296,498 B1 * | 10/2001 | Ross | .................... | H01R 25/145 439/115 |
| 6,358,070 B1 * | 3/2002 | Lin | ....................... | H01R 25/145 439/115 |
| 6,517,363 B2 * | 2/2003 | Ross | .................... | H01R 25/14 439/115 |
| 6,521,837 B2 * | 2/2003 | Hilgert | ................. | H01R 25/162 174/149 B |
| 6,805,226 B1 | 10/2004 | Ross et al. | | |
| 7,237,932 B2 * | 7/2007 | Ter-Hovhannissian | ..................... | B60Q 1/32 362/485 |
| 7,468,488 B1 | 12/2008 | Hilgert | | |
| 7,470,861 B1 * | 12/2008 | Ross | .................... | H02G 3/0418 174/101 |
| 7,497,711 B2 * | 3/2009 | Gherardini | ........... | H01R 25/162 174/72 B |
| 7,557,309 B2 | 7/2009 | Ross et al. | | |
| 7,597,565 B1 * | 10/2009 | Jorgensen | .............. | H01R 43/10 439/111 |
| 7,744,386 B1 | 6/2010 | Speidel et al. | | |
| 7,758,358 B1 * | 7/2010 | Mier-Langner | ...... | H01R 25/142 362/219 |
| 7,819,676 B1 * | 10/2010 | Cardoso | ............... | H01R 13/245 439/115 |
| 7,847,193 B2 | 12/2010 | Espeseth et al. | | |
| 8,664,530 B2 | 3/2014 | Ross et al. | | |
| 9,136,659 B2 * | 9/2015 | Fishman | ................ | H01R 29/00 |
| 9,190,791 B1 | 11/2015 | Jaena et al. | | |
| 9,275,774 B2 | 3/2016 | Ross et al. | | |
| 9,379,502 B2 | 6/2016 | Davidson, Jr. et al. | | |
| 9,520,703 B2 * | 12/2016 | Jaena | ....................... | H02G 5/08 |
| 9,564,747 B2 | 2/2017 | Ross et al. | | |
| 9,698,548 B2 | 7/2017 | Jaena et al. | | |
| 2002/0064980 A1 * | 5/2002 | Zhu | ...................... | H01R 25/145 439/115 |
| 2003/0003785 A1 * | 1/2003 | Ross | .................... | H01R 25/14 439/115 |
| 2007/0042625 A1 | 2/2007 | Otto et al. | | |
| 2009/0000817 A1 | 1/2009 | Granhaug et al. | | |
| 2013/0171849 A1 * | 7/2013 | Mooney | ................ | H02G 5/007 439/213 |
| 2014/0174782 A1 | 6/2014 | Ross et al. | | |
| 2014/0246229 A1 | 9/2014 | Ross et al. | | |
| 2014/0293516 A1 | 10/2014 | Swift et al. | | |
| 2014/0342615 A1 * | 11/2014 | Zanotto | ................. | H01R 24/20 439/626 |
| 2015/0236462 A1 | 8/2015 | Davidson, Jr. et al. | | |
| 2015/0380917 A1 | 12/2015 | Ross et al. | | |
| 2016/0156169 A1 * | 6/2016 | Jaena | ....................... | H02G 5/08 439/213 |

FOREIGN PATENT DOCUMENTS

| | | |
|---|---|---|
| EP | 2573883 A2 | 3/2013 |
| KR | 20050123064 A | 12/2005 |
| WO | 2007017133 A1 | 2/2007 |
| WO | 2013160920 A1 | 10/2013 |
| WO | 2015200435 A1 | 12/2015 |
| WO | 2016019161 A1 | 2/2016 |
| WO | 2017042652 A1 | 3/2017 |

OTHER PUBLICATIONS

English machine translation of Abstract of KR20050123064A.
English machine translation of Abstract of EP2573883A2.
English machine translation of Abstract of CN104184091A.
English machine translation of Abstract of EP2403086A1.

\* cited by examiner

STRUT END CONDITION, END BLOCK, AND CONNECTOR

BACKGROUND

Electrical bus systems are often used to provide electrical power within structures for the purpose of powering lighting fixtures, security systems, receptacles, and the like. Electrical bus systems may utilize a strut, such as a steel strut or an aluminum strut, which provides rigidity and support to the system during and after installation. The electrical bus systems typically include a plurality of electrical conductor wires, including for example, three conductor wires.

One concern in the usage of electrical bus systems is ensuring adequate insulation between adjacent conductor wires, such that an electrical "short" is not created by electrical current passing from one conductor wire to the other in an unintended manner. As such, electrical bus systems may use insulators and isolators as illustrated herein configured to maximize the distance between conductor wires while minimizing the cross-sectional size of the bus system.

However, existing electrical bus systems often require that conductor wires be exposed and cantilevered out from the protective insulator at the ends of the strut assemblies to permit connection of one strut assembly to another. These exposed conductors must be handled with care during installation to ensure that they do not become deformed or bent, which may result in difficulty in installing an electrical connector between the strut assemblies. Additionally, these exposed conductors may create a risk if power was inadvertently supplied to the bus system during installation, maintenance, or any other instance where a connector may be removed from the system, both from the standpoint of electrical current passing from one conductor to another and causing a short, and from the standpoint of an increased likelihood of contact with the conductors by an electrician working on the system. Exposed conductors are sometimes inadvertently left at the end of a "run" of a bus system, where no connector is necessary to attach to an additional strut assembly because there is no additional strut assembly. As a result, the individual installing the bus system may unintentionally leave the conductor ends exposed, without a connector, and accordingly at risk for contact with a person or a short.

What is needed is an improved strut end condition, end block, and connector to maintain the insulation of the electrical conductors at all times.

SUMMARY

In one embodiment, a strut assembly is provided, the strut assembly comprising: a strut; an insulator; at least one conductor wire oriented within the insulator; and an end block oriented within an end of the strut, the end block nesting within the strut.

In one embodiment, a connector for connecting two strut assemblies is provided, the connector comprising: an upper housing having at least one conductor element having vertical elements at opposing ends; a lower housing, the lower housing including: two lower housing wings, and rotatable locking cams oriented on each of the lower housing wings, the rotatable locking cams having two opposing flat sides and two opposing rounded ends.

In one embodiment, a system including a series of strut assemblies joined by a connector is provided, the system comprising: two strut assemblies oriented end-to-end, each including: a strut; an insulator; at least one conductor wire oriented within the insulator; and an end block oriented within an end of the strut, the end block nesting within the strut; a connector spanning a junction created by adjacent ends of the two strut assemblies, the connector including: an upper housing having at least one conductor element having vertical elements at opposing ends; a lower housing, the lower housing including: two lower housing wings, and rotatable locking cams oriented on each of the lower housing wings, the rotatable locking cams having two opposing flat sides and two opposing rounded ends; wherein the locking cams are rotatable to engage the connector with each of the two strut assemblies.

BRIEF DESCRIPTION OF THE DRAWINGS

The accompanying figures, which are incorporated in and constitute a part of the specification, illustrate various example configurations, and are used merely to illustrate various example embodiments. In the figures, like elements bear like reference numerals.

DETAILED DESCRIPTION

Figure 1A:
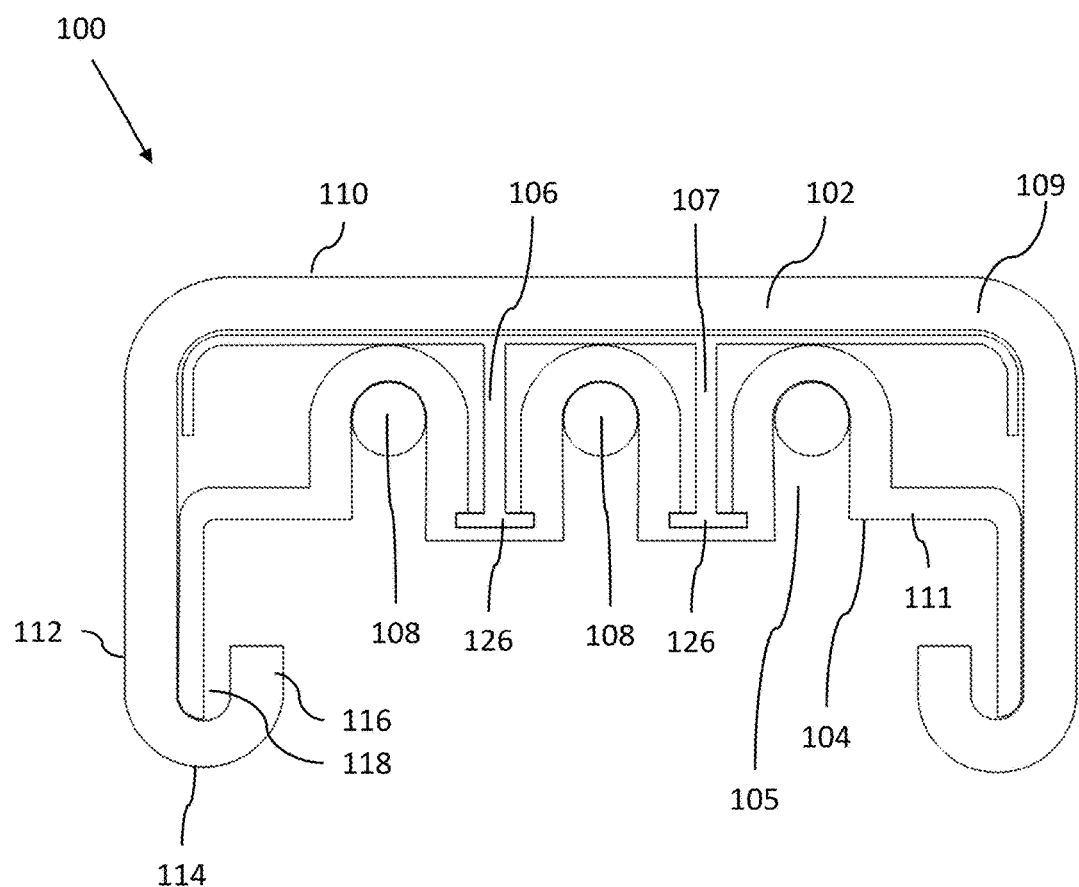
FIG. 1A illustrates an elevational view of an electrical strut assembly 100.

FIGS. 1A-1D illustrate an electrical strut assembly 100. Strut assembly 100 may include a strut 102. Strut 102 may be made out of any of a variety of materials, including for example, a metal such as steel or aluminum, a polymer, and the like. Strut 102 may include an upper surface 110, sidewalls 112, and lower surfaces 114. Strut 102 may be generally "C" shaped. Strut 102 may include turnup portions that may bend about 180 degrees from the direction of sidewalls 112 to create a ledge 116 and a groove 118. Strut 102 includes an end 109.

Sidewalls 112 may be opposed to one another. Sidewalls 112 may be substantially parallel.

Upper surface 110 and lower surface 114 may be opposed to one another, with sidewalls 112 oriented therebetween. The sectional profile of strut 102 may be substantially rectangular in shape. The sectional profile of strut 102 may have any of a variety of shapes, including for example, square, circular, triangular, quadrilateral, and the like.

Strut assembly 100 may include an insulator 104. Insulator 104 may be made out of any of a variety of materials that are insulative with respect to electricity (i.e., materials that do not readily conduct electricity, or that do not conduct electricity having the current and voltage values desired by one making strut assembly 100). Insulator 104 may include a wire aperture 105 corresponding to each conductor wire 108 to be included in strut assembly 100. Insulator 104 may include voids between wire apertures 105 for receiving dividers 107 of an isolator 106. Insulator 104 may include legs that extend into groove 118 of strut 102 to secure insulator 104 within strut 102. It is noted that when conductor wires 108 are installed into wire apertures 105 within insulator 104, that assembly may be referred to as a "wireway." Insulator 104 may include a distal end 111. Insulator 104 may include two distal ends 111, with one at each end of insulator 104.

Strut assembly 100 may include an isolator 106. Isolator 106 may be shaped to fit within the upper interior of steel strut 102, and may include a profile substantially similar to the upper interior of steel strut 102. Isolator 106 may be made out of any of a variety of materials that are insulative with respect to electricity. As noted above, isolator may include at least one divider 107 sized and oriented to fit between wire apertures 105 of insulator 104. At least one divider 107 may include a divider base 126. Divider base 126 is further described below.

Figure 1B:
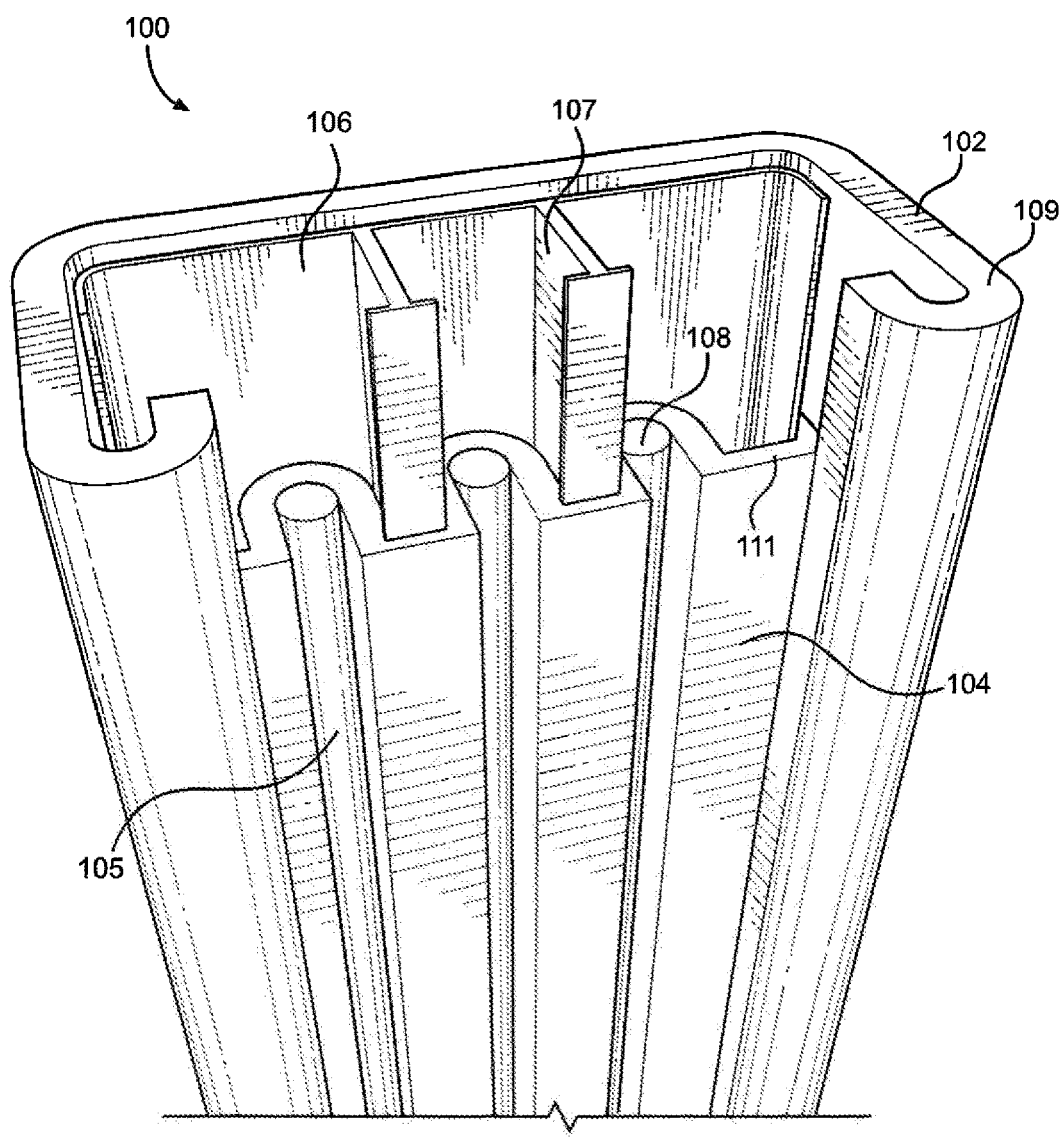
FIG. 1B illustrates a perspective view of the electrical strut assembly 100.
Figure 1C:
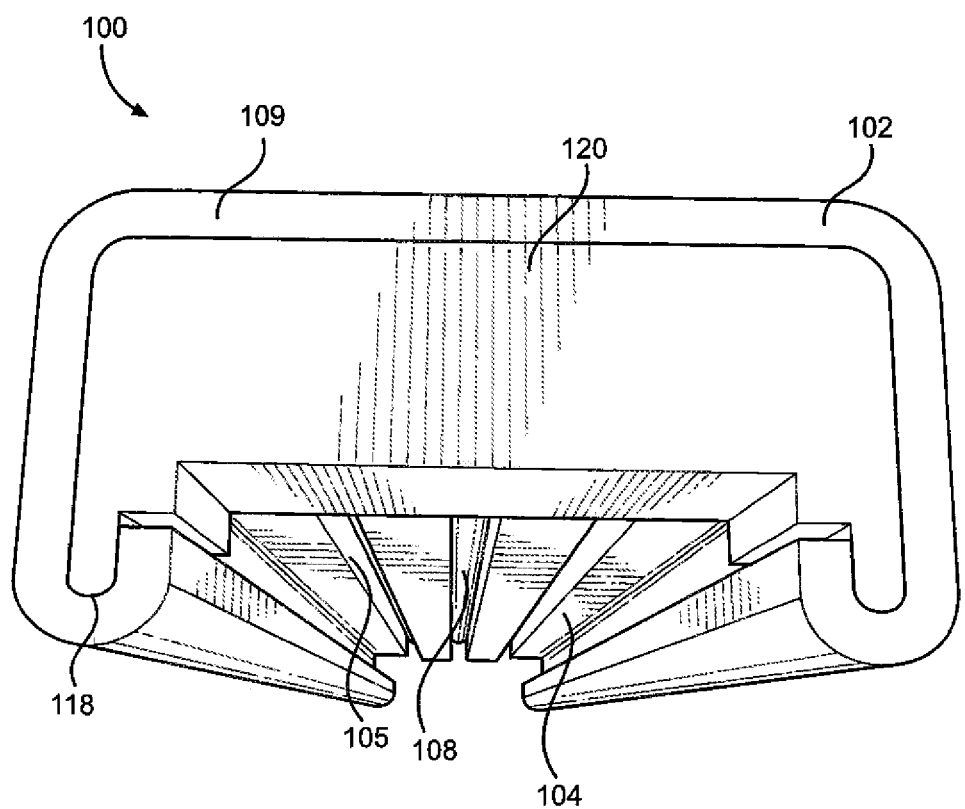
FIG. 1C illustrates a perspective view of the electrical strut assembly 100 including an end block 120.

As illustrated in FIG. 1B, the wireway (insulator 104 including conductor wires 108) does not extend all the way to end 109 of steel strut 102. On the other hand, isolator 106 may extend substantially to end 109 of steel strut 102. This arrangement permits installation of an end block 120 as illustrated in FIG. 1C and FIG. 1D.

Figure 1D:
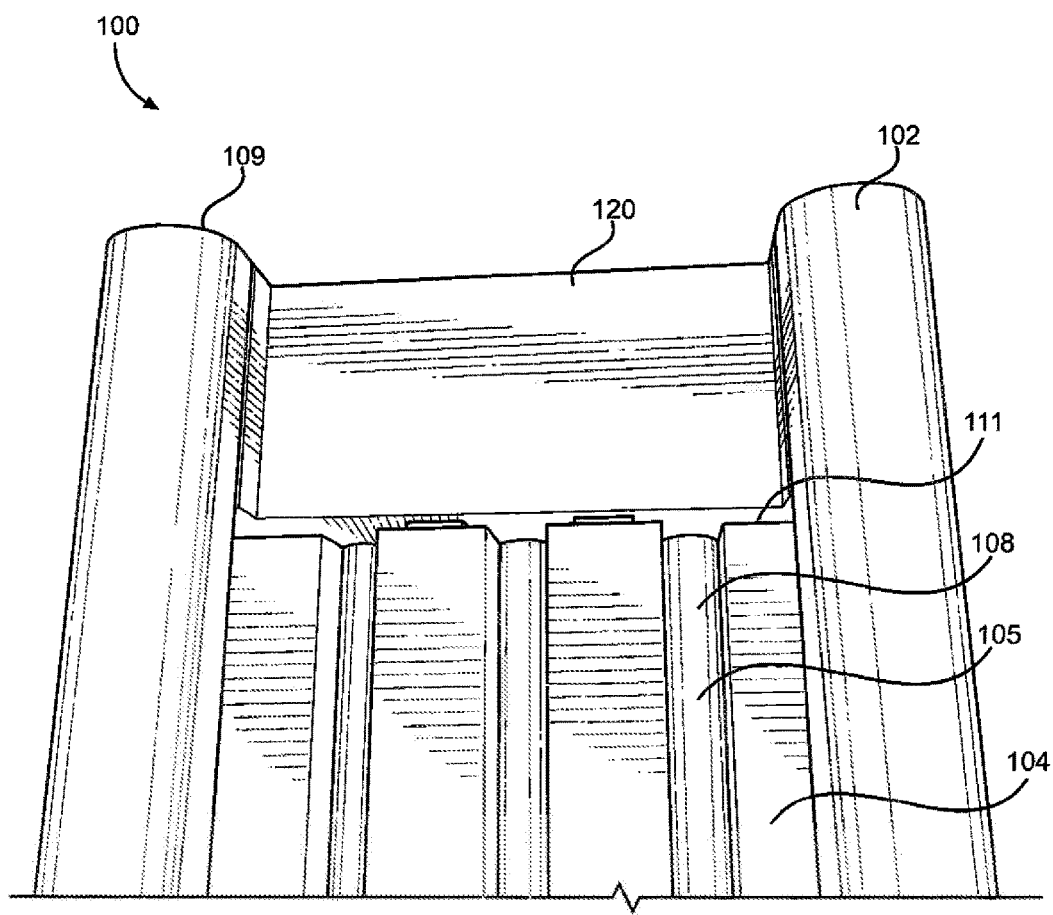
FIG. 1D illustrates a perspective view of the electrical strut assembly 100 including end block 120.

As illustrated in FIG. 1D, end block 120 may include a profile that is substantially similar to the interior profile of strut 102, such that end block 120 nests within strut 102. As further described below, in some embodiments, isolator 106 is oriented between end block 120 and strut 102.

In one embodiment, isolator 106 may be removed from strut assembly 100 altogether, and its function may be replaced by a modified end block 120. End block 120 and isolator 106 may be combined into one part capable of performing the functions of both elements. The combined end block and isolator may have all of the features of the end block 120 and isolator 106. The combined end block and isolator may be made out of electrically insulative materials.

End block 120 may include legs that extend into groove 118 of strut 102. Such an arrangement may assist in maintaining end block 120 securely within strut 102.

End block 120 may extend substantially to end 109 of strut 102. End block 120 may not extend to end 109, or may extend past end 109 slightly, without disrupting the purpose and function of end block 120.

End block 120 may be made out of any of a variety of materials. While it can be made from an insulative material, end block 120 does not need to be made from an insulative material. End block 120 may be made from a deformable material, such as a polymer, rubber, or the like, which may be friction fit into the end of strut 102. End block 120 may be designed with deformable members forming at least a part of its outer periphery, which deformable members may engage the interior of strut 102 in a friction fit. Alternatively, end block 120 may be secured within strut 102 via any of a variety of fasteners, including for example, a set screw, a screw, rivet, an adhesive, and the like.

As illustrated in FIG. 1D, end block 120 may substantially span the gap created between the termination point of the wireway (insulator 104 and conductor wires 108) and end 109 of strut 102.

End block 120 may act to "cap" the end of strut assembly 100, thereby protecting and/or securing the ends of conductor wires 108. End block 120 may act to secure insulator 104 within strut 102. Isolator 106 may be oriented between insulator 104 and end block 120. Alternatively, isolator 106 may act to "cap" the end of strut assembly 100, particularly where isolator 106 includes containment elements (see FIGS. 7A, 7B, and 8), and end block 120 may act to secure insulator 104 into place in strut assembly 100. Additionally, as conductor wires 108 do not extend past the end of insulator 104, conductor wires 108 may be less prone to damage, accidental contact by an electrician, and short circuiting.

FIGS. 2A, 2B, 2C, and 2D illustrate an electrical strut assembly 200. Strut assembly 200 may include a strut 202, an insulator 204, an isolator 206, at least one conductor wire 208, and an end block 220. Insulator 204 may include two distal ends 211.

Figure 2A:
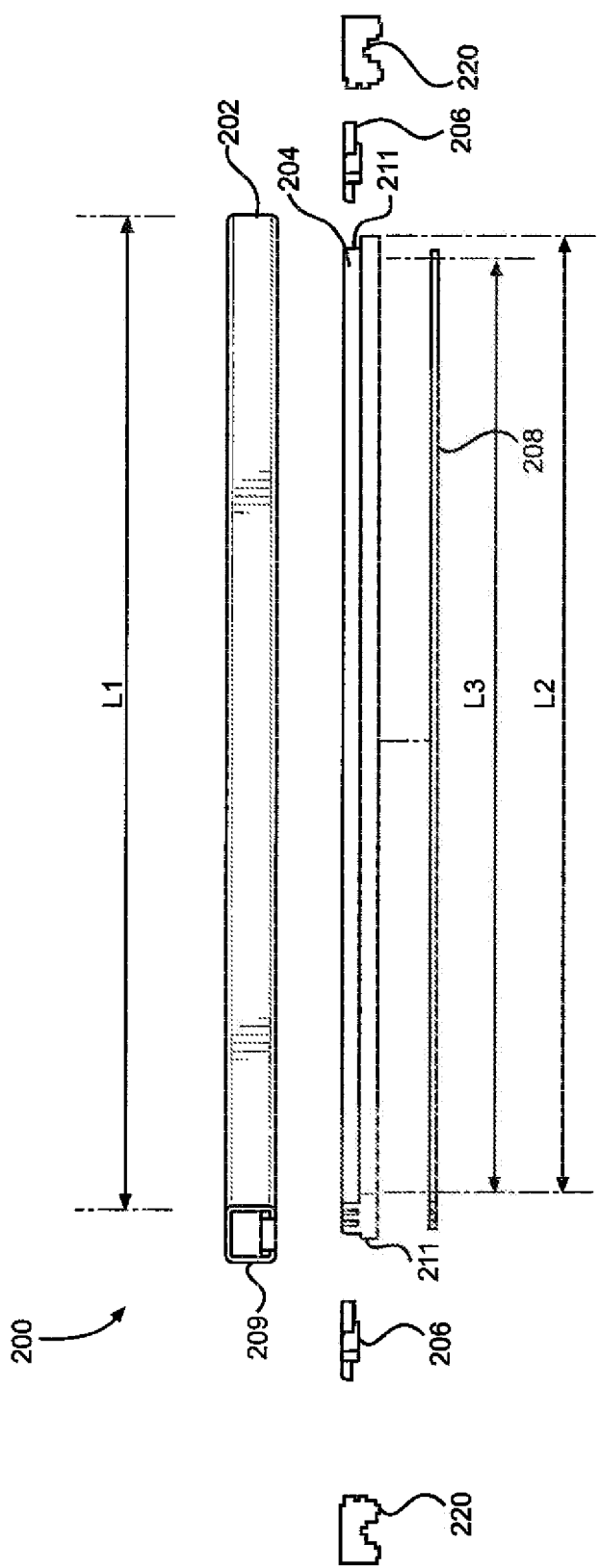
FIG. 2A illustrates an exploded view of an electrical strut assembly 200.

FIG. 2A illustrates an exploded view of strut assembly 200. Insulator 204 may have a length L2. Length L2 may be less than length L1 of strut 202. In one embodiment, length L2 is less than length L1, such that insulator 204 terminates short of ends 209 of strut 202 on both ends of strut 202. In such an arrangement, a gap exists between the ends of insulator 204 and ends 209 of strut 202.

Figure 2B:
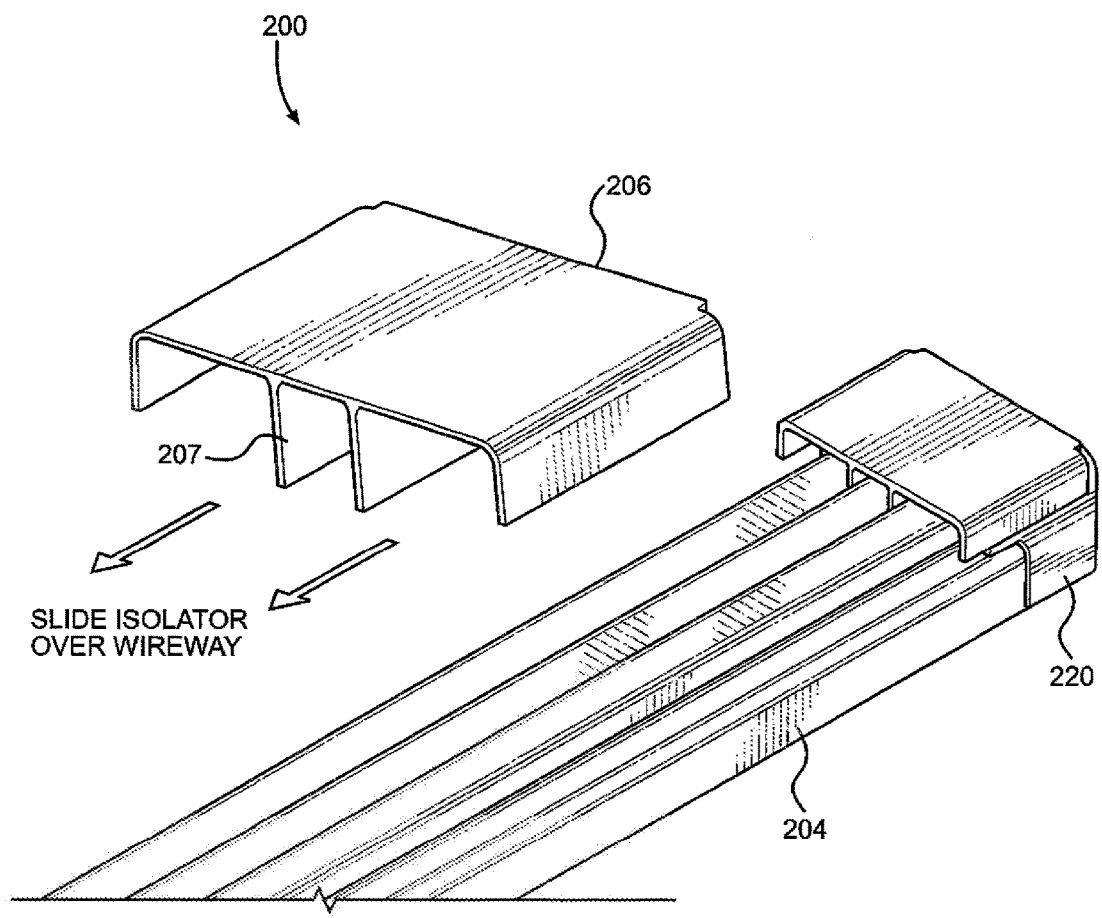
FIG. 2B illustrates a perspective view of electrical strut assembly 200 including an insulator 204 in engagement with an isolator 206.
Figure 2C:
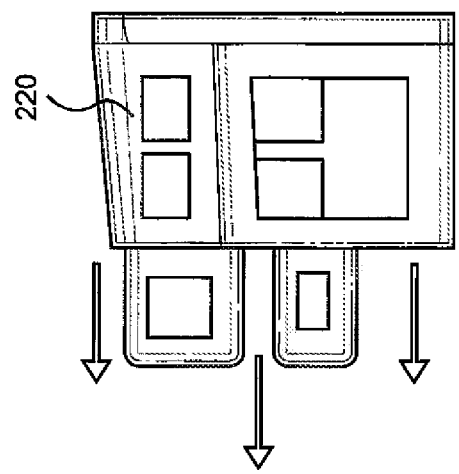
FIG. 2C illustrates an elevational view of electrical strut assembly 200 including insulator 204 in engagement with isolator 206, and an end block 220.
Figure 2C:
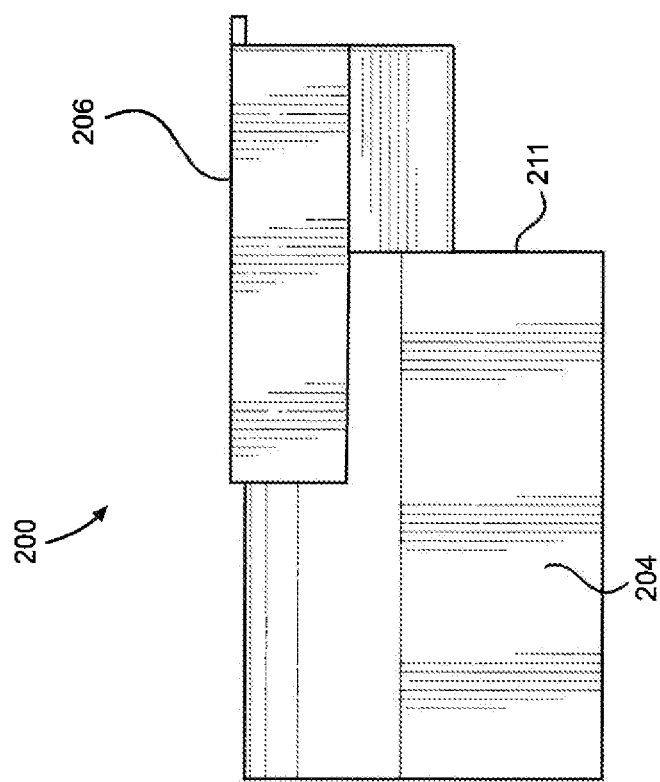

As illustrated in FIGS. 2B and 2C, isolator 206 can slide over the end of insulator 204. Conducting wires 208 may be installed into insulator 204 to form a wireway. After installation of isolator 206 onto the end of the wireway, end block 220 may be inserted into isolator 206. As discussed above, isolator 206 may include dividers 207 configured to fit within the gaps formed between the wire apertures (not shown in FIG. 2B, but described above as wire apertures 105 and illustrated in FIGS. 1A, 1B, 1C, and 1D).

Figure 2D:
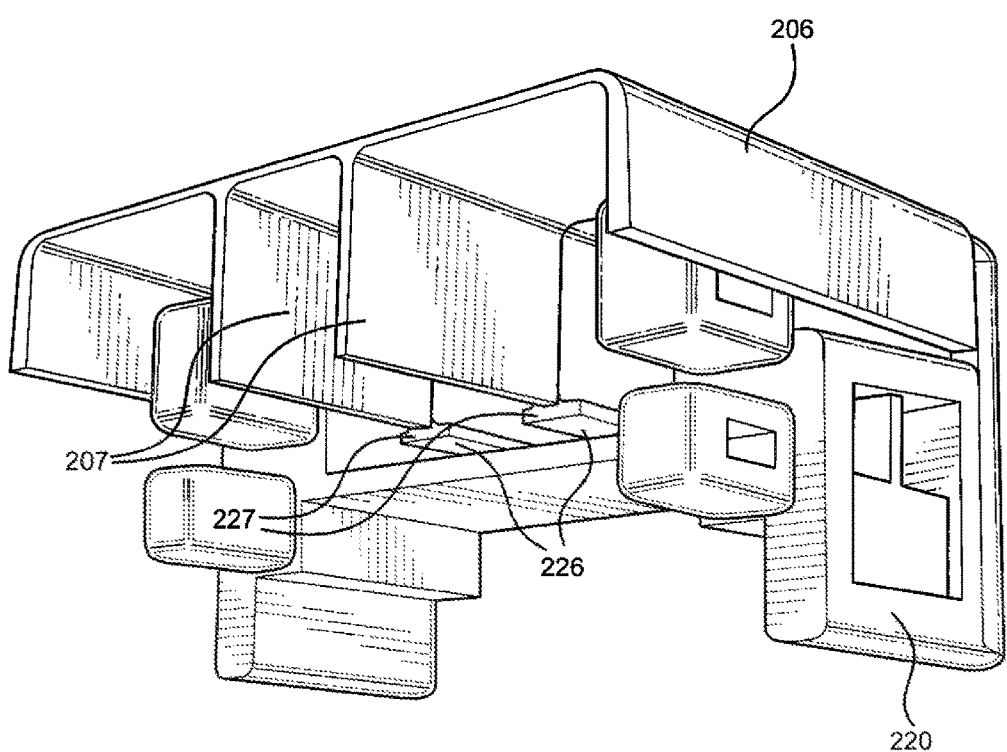
FIG. 2D illustrates a perspective view of isolator 206 in engagement with end block 220.

As illustrated in FIG. 2D, end block 220 may be sized and shaped to fit within the interior of isolator 206. Each of dividers 207 may include a divider base 226 having a divider base proximal end 227. Divider base 226 may extend along the lower portion of divider 207. Divider base proximal end 227 may at least partially engage a distal end 211 of insulator 204. Divider base proximal end 227 may be configured to prevent isolator 206 from extending past a desired point on insulator 204. That is, as illustrated in FIG. 2C, isolator 206 may slide over a distal end 211 of insulator 204, and divider base proximal end 227 may contact and may at least partially engage distal end 211 to prevent isolator 206 from sliding past distal end 211 an undesirable distance. As illustrated in FIGS. 2C and 2D, isolator 206 may be configured to slide onto insulator 204 only far enough such that dividers 207 may extend between wire apertures (105 in FIG. 1A), while end block 220 may extend into the remaining portion of isolator 206, with divider bases 226 preventing over-insertion of isolator 206 onto insulator 204.

Figure 3A:
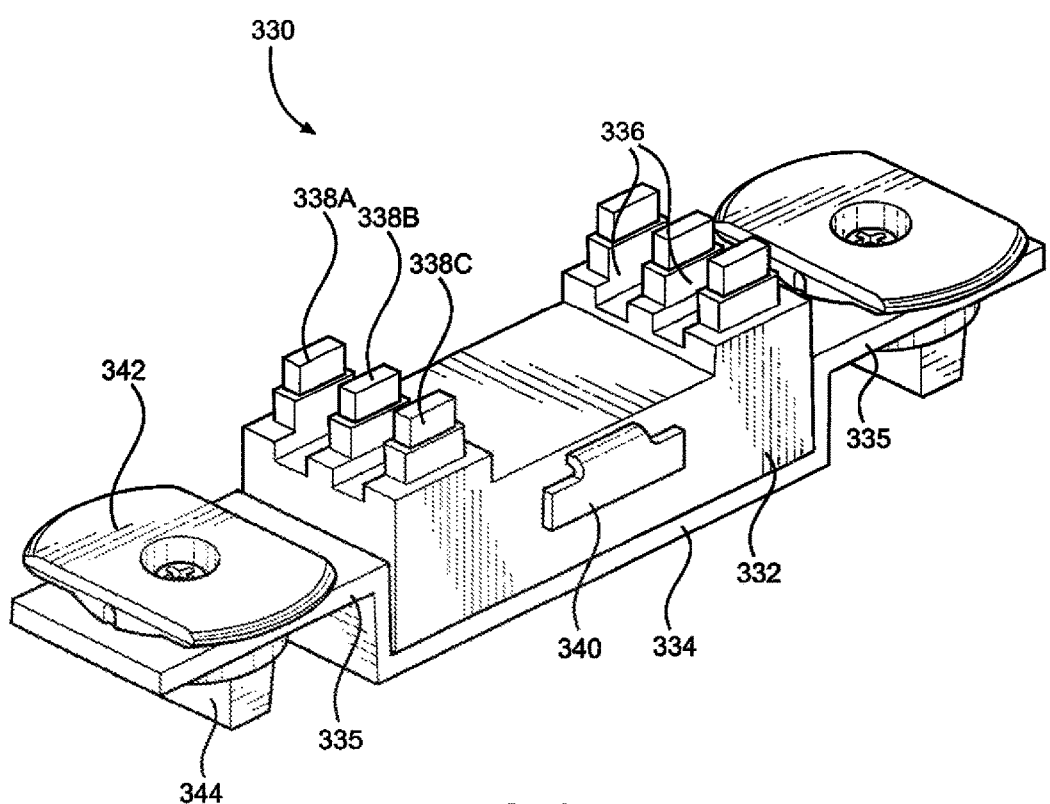
FIG. 3A illustrates a perspective view of a connector 330.
Figure 3B:
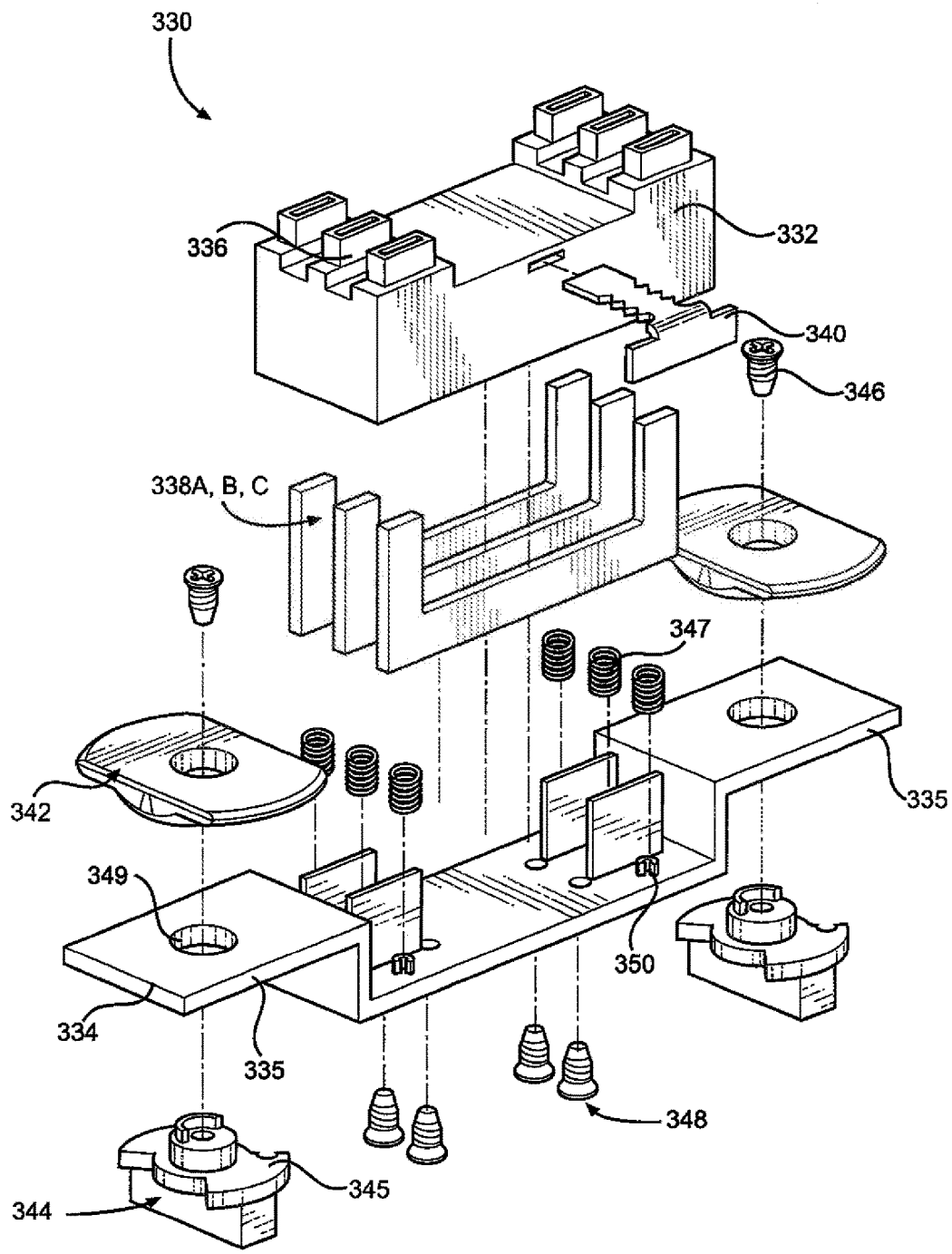
FIG. 3B illustrates an exploded view of connector 330.

FIGS. 3A and 3B illustrate a connector 330. Connector 330 is configured to joint two strut assemblies oriented adjacent to one another end-to-end, in a linear arrangement. Connector 330 allows for the connecting of strut assemblies in a row to extend the length of strut assemblies and electrical power to a desired length.

Connector 330 may include an upper housing 332 and a lower housing 334.

Upper housing 332 may include on its upper side, opposite lower housing 334, at least one conductor collar 336. Upper housing 332 may include conductor elements 338A, 338B, and 338C. Conductor collar 336 includes an aperture allowing a portion of the conductor element to pass therethrough, while providing lateral stability and guiding of the conductor element. In addition, conductor collar 336 ensures that electrical distances are maintained to insulate conductor elements 338A, 338B, and 338C. It is noted that connector 330 may include more or less than three conductor elements. Connector 330 may include the same number of conductor elements as conductor wires included in the strut assembly to which connector 330 is to be applied. As illustrated in FIG. 3B, conductor elements 338A, 338B, and 338C extend along the length of upper housing 332, such that the same conductor element is exposed at a first end of upper housing 332 and a second end of upper housing 332. In this manner, a single conductor element can contact a first conductor wire of a first strut assembly, and a corresponding first conductor wire of a second strut assembly, thus completing an electrical connection between the corresponding first conductor wires. This same concept applies to the remaining corresponding conducting wires contained in adjacent, end-to-end strut assemblies, thus creating an electrical connection between the corresponding conductor wires.

Upper housing 332 may include a ground element 340 for grounding connector 330 and/or the strut assemblies, to the earth.

Lower housing 334 may include a pair of lower housing wings 335 extending from the ends of upper housing 332. Each lower housing wing 335 may include a locking cam 342 configured to engage a strut (such as strut 102 and strut 202). Locking cam 342 may engage ledge 116 of the strut, such as strut 102. Locking cam 342 may be shaped with two flat sides, and two rounded ends, in a generally elongated arrangement with the flat sides making up the long sides, and the rounded ends making up the short sides. In this manner, locking came 342 may be oriented with its long, flat sides parallel to the longitudinal length of connector 330, and its rounded ends perpendicular to the longitudinal length of connector 330. This orientation may allow locking cam 342 to extend upwardly into a strut, such as strut 102 or strut 202, through the gap created between opposing ledges 116. Upon locking cam 342 passing above ledges 116, locking cam 342 may be rotated, for example, about 90 degrees, such that its long, flat sides are perpendicular to the longitudinal length of connector 330, and its rounded ends are parallel to the longitudinal length of connector 330. In this manner, locking cam 342 may engage the upper surface of ledges 116 such that locking cam 342, and thus connector 330, cannot be removed from strut 102 or strut 202. This concept is further below with respect to FIG. 6. Locking cam 342 may have long, flat sides that are opposing one another, and are spaced apart a distance equal to or less than the lateral width of upper housing 332, such that locking cam 342 has a width between its long, flat sides that is not greater than the lateral width of upper housing 332.

Each locking cam 342 may be operatively connected to a locking element 344. Locking element 344 may include a means to allow a user of connector 330 to selectively rotate locking cam 342. For example, locking element 344 may include a knob that a user can grasp with the user's fingers. Alternatively, or additionally, locking element 344 may include a slot, Philips bit recess, torx bit recess, or the like to allow a user to turn locking element 344 with a screwdriver. Alternatively, or additionally, locking element 344 may include a nut, block, or the like to allow a user to turn locking element 344 with a wrench or nut driver.

With reference to FIG. 3B, an exploded perspective view of connector 330, connector 330 may include ground element 340 configured to be selectively inserted or removed from upper housing 332 via an aperture. Ground element 340 is inserted laterally into upper housing 332. Ground element 340 may extend at least partially out of upper housing 332, and may include an electrically conductive material that electrically contacts adjacent struts (not shown) to create an electrical grounding circuit between the adjacent struts.

As shown, each of conductor elements 338A, 338B, and 338C may be generally "U-shaped" with a long, longitudinal element and two vertical elements. The vertical lengths are configured to extend through apertures in conductor collars 336. Alternatively, conductor elements 338A, 338B, and 338C may simply be elongated elements with vertical elements at opposing ends. Alternatively, conductor elements 338A, 338B, and 338C may comprise two vertical elements with an electrically conductive connection (e.g., a wire) oriented therebetween.

Locking cam 342 may be fastened to locking element 344 via a locking element fastener 346, which may include any of a variety of fasteners, such as a screw, bolt, rivet, adhesive, or the like. Each of lower housing wings 335 may include a wing aperture 349 configured to allow locking element fastener 346 to pass therethrough, to fasten locking cam 342 to locking element 344.

Locking element 344 may include at least one locking element stop 345, which may selectively engage lower housing wing 335 to constrain rotation of locking element 344 and locking cam 342 within a desired range of rotational motion. For example, locking element stop 345 may constrain the rotation of locking element 344 and locking cam 342 to about 90 degrees, such that a user may experience a positive "stop" when rotating locking element 344, to alert the user that locking cam 342 is in its "locked" or "unlocked" position.

Connector 330 may include biasing elements 347 configured to bias conductor elements 338A, 338B, and 338C into an upward position, which when connector 330 is installed into a series of bus assemblies, helps to force conductor elements 338A, 338B, and 338C into contact with conductor wires, such as conductor wires 108 and 208. Biasing elements 347 may additionally permit conductor elements 338A, 338B, and 338C to deflect downwardly upon installation, such that tolerances within connector 330 and the corresponding strut assemblies are able to be loosened while ensuring adequate contact between conductor elements 338A, 338B, and 338C and corresponding conductor wires. It should be noted that the strut assemblies referenced herein are any of the strut assemblies described above, or below, including strut assemblies 100, 200, 400, 500, and 600.

Biasing elements 347 may encircle, at their lower ends (opposite conductor elements 338A, 338B, and 338C) biasing element guides 350. Lower housing may have one biasing element guide 350 corresponding to each biasing element 347. Biasing element guide 350 may act to maintain the position of biasing elements 347 within connector 330, so as to ensure that the upper end (opposite biasing element guide 350) maintains connect with conductor elements 338A, 338B, and 338C.

Upper housing 332 and lower housing 334 may be connected to one another by housing fasteners 348. Housing fasteners 348 may include any of a variety of fasteners, including for example, a screw, a bolt, a rivet, an adhesive, and the like.

Figure 4:
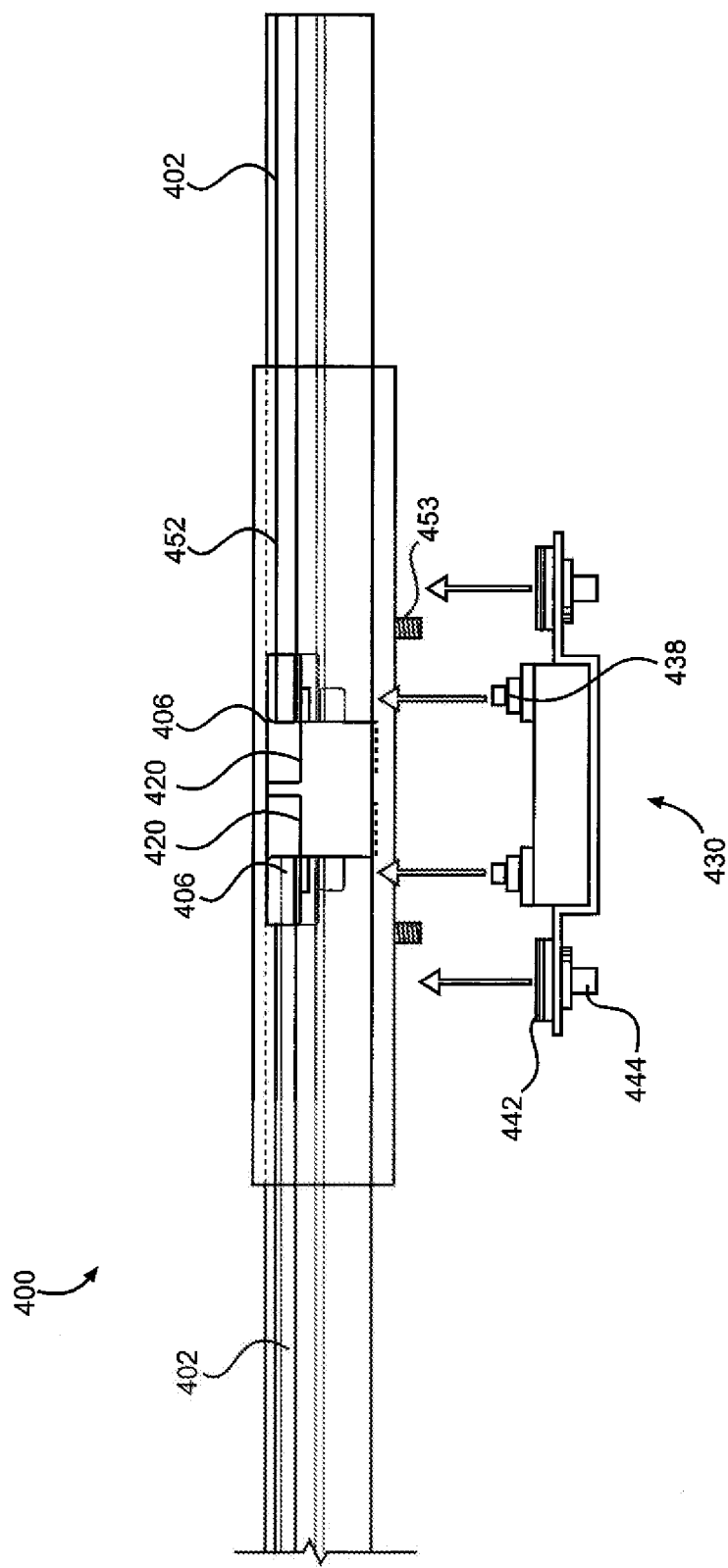
FIG. 4 illustrates an elevational view of two electrical strut assemblies 400 connected with a connector 430.

FIG. 4 illustrates two electrical strut assemblies 400 connected with a connector 430. Strut assemblies 400 may include two struts 402 oriented in an end-to-end arrangement. Each of strut assemblies 400 may include an isolator 406 and end block 420, as described above.

Connector 430 may include two locking cams 442, each having a corresponding locking element 444. As illustrated, two strut assemblies 400 are oriented in an end-to-end arrangement, with end blocks 420 facing one another. Connector 430 may be inserted from the lower side of strut assemblies 400, such that conducting elements 438 contact the conducting wires contained within strut assemblies 400. Once locking cams 442 clear the ledge of the strut, locking element 444 may be manipulated, for example, rotated, to cause locking cam 442 to rotate and engage the upper edge of the shelf. In this manner, connector 430 may complete an electrical circuit between corresponding conductor wires within strut assemblies 400, and may be "locked" into position. As illustrated, each of the two strut assemblies 400 receives one locking cam 442. The connection between strut assemblies 400 may be concealed, protected, and/or otherwise contained by a cover 452 placed over the junction. Cover 452 may act to ensure that the junction has the required strength inherent in the struts 402, such that the junction is not a weak point in a series of struts 402. Cover 452 may additionally create an electric ground connection between adjacent struts 402. Cover 452 may include at least one electrically conductive fastener, such as a set screw 453, per strut 402. The electrically conductive fastener, such as set screw 453, may engage strut 402, to complete an electrical ground circuit. In this manner, two adjacent struts 402 may be electrically connected through cover 452 to provide an electrical ground connection therebetween. To effect this electrical ground connection, each of struts 402, cover 452, and electrically conductive fasteners, may be made from electrically conductive materials, such as a metal.

Figure 5:
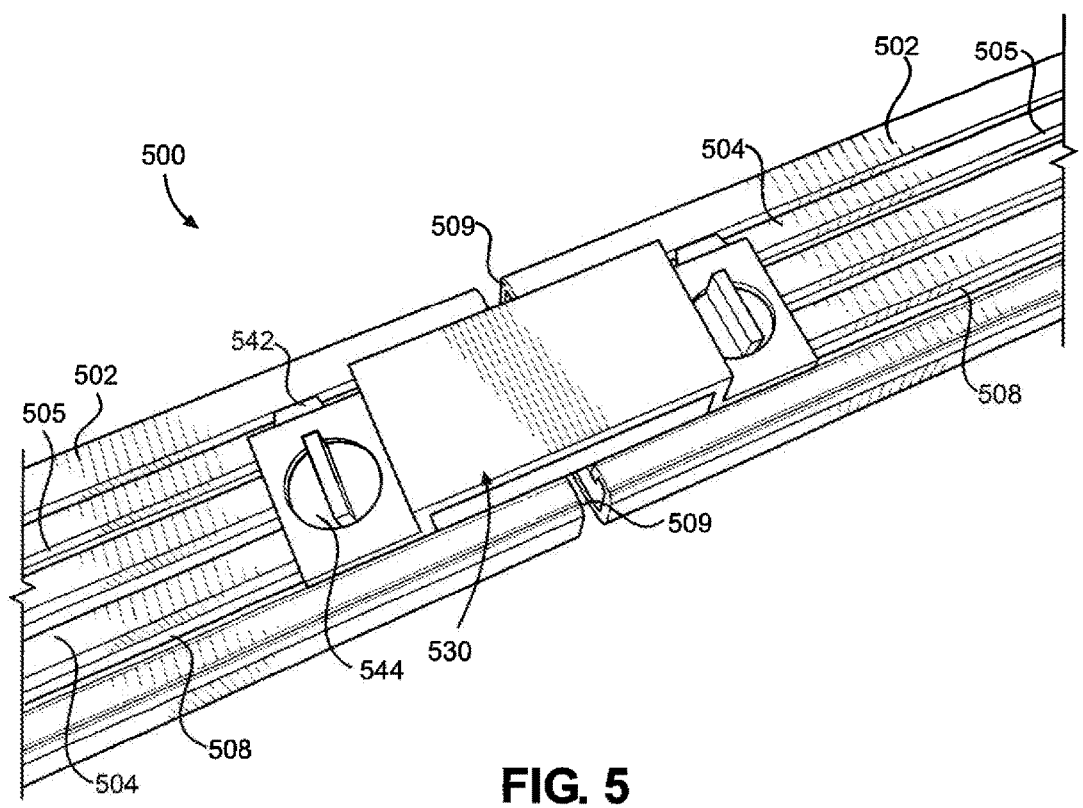
FIG. 5 illustrates a perspective view of two electrical strut assemblies 500 connected with a connector 530.

FIG. 5 illustrates two electrical strut assemblies 500 connected with a connector 530. Strut assemblies 500 may be oriented end-to-end, such that the ends 509 of struts 502 are oriented adjacent to one another, or touching one another. Strut assemblies 500 may include insulators 504, and conductor wires 508 inserted through wire aperture 505.

Connector 530 may be oriented below strut assemblies 500, and inserted into strut assemblies 500. Locking cams 542 may be manipulated via locking elements 544 so as to rotate and create engagement with strut 502. In one embodiment, locking cams 542 may engage a ledge (e.g., ledge 116) of strut 502.

Upon locking of locking cams 542, connector 530 may be fully engaged with each of strut assemblies 500, thereby completing an electrical connection between corresponding conductor wires 508.

Figure 6:
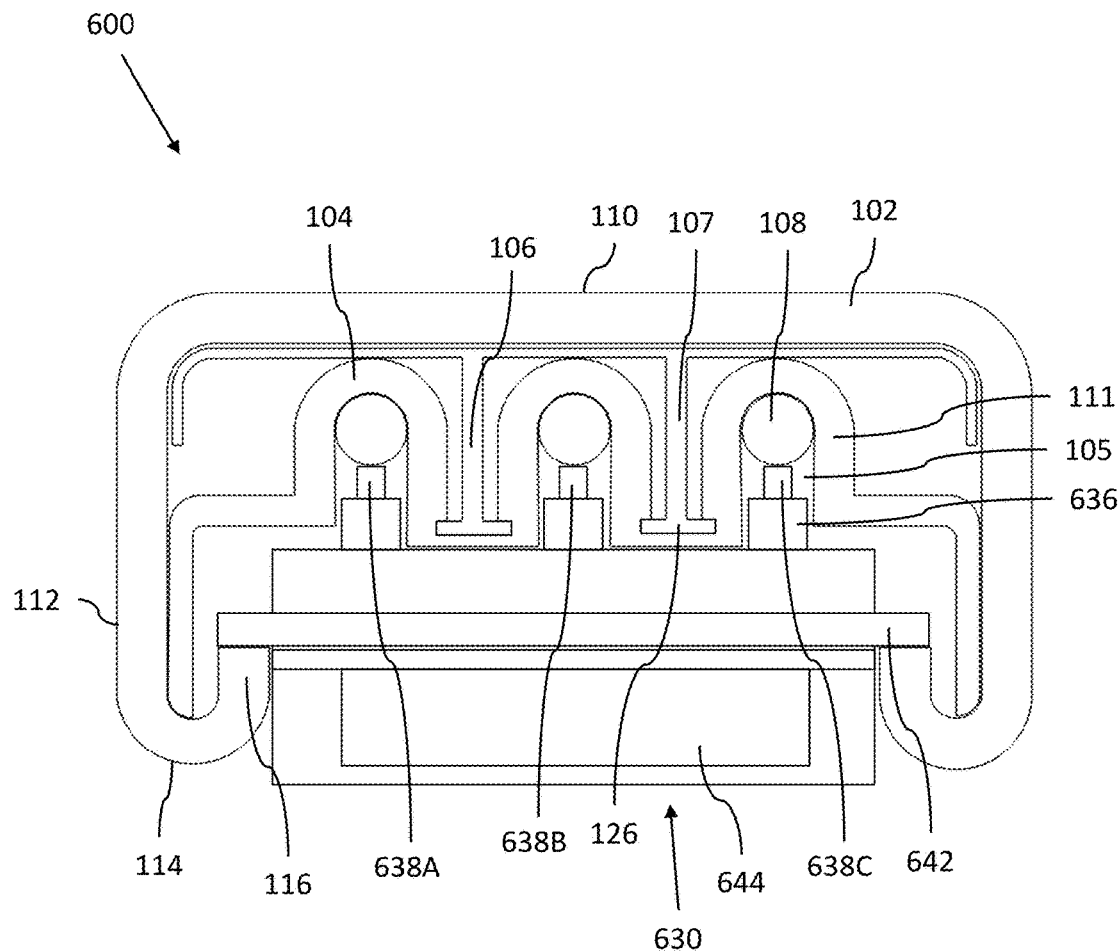
FIG. 6 illustrates a sectional view of an electrical strut assembly 600 engaged with a connector 630.

FIG. 6 illustrates a sectional view of an electrical strut assembly 600 engaged with a connector 630. Strut assembly 600 may include a strut 102 having an upper surface 110, a lower surface 114, upper surface 110 opposing lower surface 114, wherein upper surface 110 and lower surface 114 are connected via sidewalls 112. Strut 102 may have a turnup near its lower surface, creating a ledge 116.

Strut assembly 600 may include an insulator 104, an isolator 106, and at least one conductor wire 108. Insulator 104 may include at least one wire aperture 105, through which conductor wires 108 may be inserted into insulator 104. Insulator 104 may include one or more distal ends 111. Isolator 106 may include dividers 107 including divider bases 126.

Connector 630 may include any of the features described above with respect to the connectors. Connector 630 may include a plurality of conductor elements, such as conductor elements 638A, 638B, and 638C. Each of conductor elements 638A, 638B, and 638C may extend through a conductor collar 636. Conductor collar 636 may be oriented within and at least partially bound by the walls of wire aperture 105.

Connector 630 may include a locking cam 642 operatively connected to, and manipulable by, a locking element 644. Locking cam 642 is illustrated in FIG. 6 in its "locked" position. That is, the laterally outer edges of locking cam 642 extend outwardly past the lateral edges of the upper housing of connector 630, thus preventing connector 630 from being withdrawn (downwardly) from strut assembly 600 and strut 102. Where locking cam 642 is rotated and its lateral edges do not extend outwardly past the lateral edges of the upper housing of connector 630, this position may be its "unlocked" position and may allow for withdrawal of connector 630 from strut assembly 600 and strut 102.

When connector 630 is installed into strut assembly 600, conductor elements 638A, 638B, and 638C may contact each of the respective conductor wires 108. Conductor elements 638A, 638B, and 638C may be biased into contact with conductor wires 108 by biasing elements, such as biasing elements 347. Conductor elements 638A, 638B, and 638C may deflect downwardly (into the upper housing of connector 630) if conductor elements 638A, 638B, and 638C extend too far above connector 630, and, if solidly mounted within connector 630, would not allow for connector 630 to be extended completely into strut assembly 600 and strut 102 such that locking cam 642 could engage ledge 116 of strut 102. Thus, biasing elements within connector 630 ensure adequate contact between conductor elements 638A, 638B, and 638C and conductor wires 108, and permit lower tolerances in the manufacture of connector 630 and strut assembly 600.

Figure 7A:
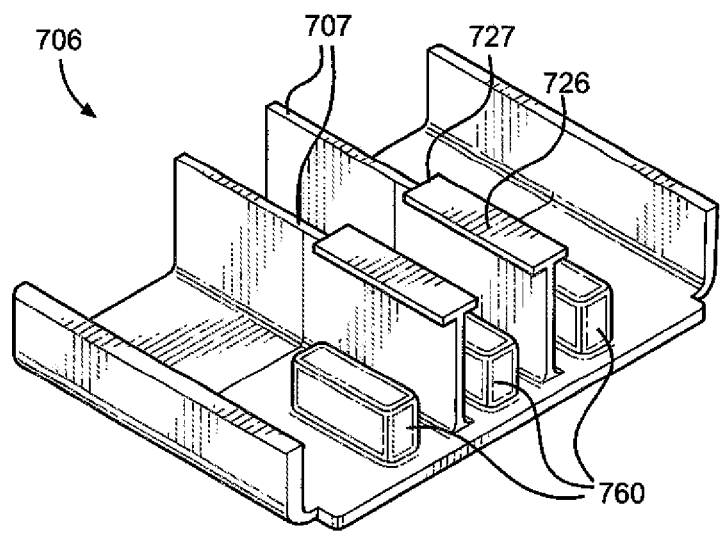
FIG. 7A illustrates a perspective view of an isolator 706.
Figure 7B:
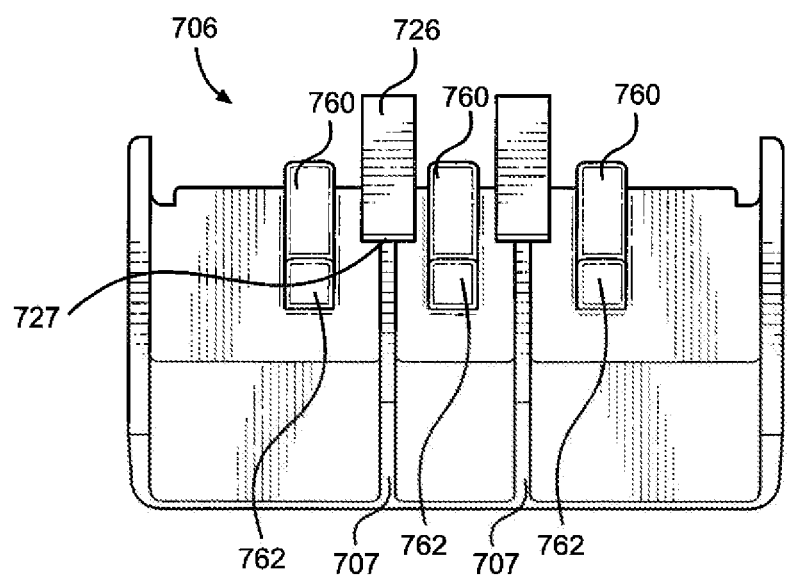
FIG. 7B illustrates a perspective view of isolator 706.

FIGS. 7A and 7B illustrate an isolator 706. Isolator 706 may include one or more divider 707 configured to provide an insulative barrier between conductor wires (not shown). One or more divider 707 may include a divider base 726. Divider base 726 may extend along the lower portion of divider 707. Divider base 726 may include a divider base proximal end 727.

Isolator 706 may include at least one containment element 760. Isolator 706 may include one more containment element 760 than dividers 707. Containment elements 760 may act as a block configured to constrain longitudinal movement of conductor wires (not shown, illustrated in FIG. 8). As such, isolator 706 may include one containment element 760 for each conductor wire (not shown).

Each containment element 760 may include a proximal end 762. Proximal end 762 may be configured to engage, at least periodically, an end of conductor wire (not shown). Proximal end 762 may constrain longitudinal movement of conductor wires (not shown) by acting as a "block" and being in the path that conductor wires would have to move to slide out of the insulator (not shown). In this manner, containment element 760 may act to prevent the conductor wires (not shown) from sliding out of the insulator (not shown). Containment element 760 may prevent the conductor wires from moving more than a desired distance out of the insulator, which desired distance is that which would prevent conductor wires from extending past isolator 706.

Figure 8:
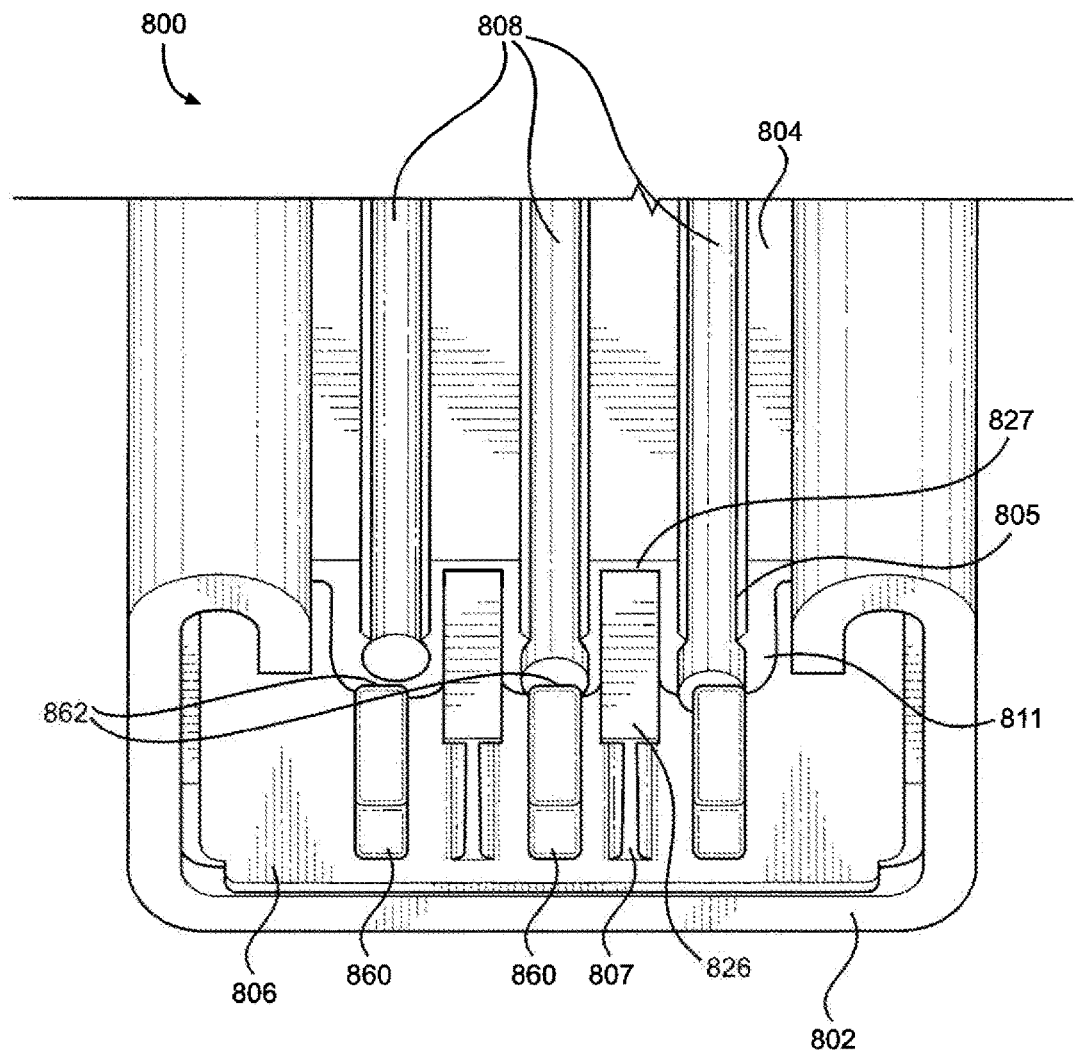
FIG. 8 illustrates a perspective view of electrical strut assembly 800 including an isolator 806 including a plurality of containment elements 860.

FIG. 8 an electrical strut assembly 800 including an isolator 806 including a plurality of containment elements 860. Strut assembly 800 may include a strut 802. Strut assembly 800 may include an insulator 804. Insulator 804 may include a wire aperture 805 corresponding to each conductor wire 808 to be included in strut assembly 800.

Isolator 806 may include at least one divider 807 oriented in a position that is between the axial axes of conductor wires 808. At least one of dividers 807 may include a divider base 826.

Isolator 806 may include at least one containment element 860. In one embodiment, isolator 806 includes one containment element 860 for each conductor wire 808 included in assembly 800. Each containment element 860 may be oriented and configured to constrain or prevent excess longitudinal movement of conductor wires 808, but effectively blocking the axial path of conductor wires 808 and as such, preventing conductor wires 808 from sliding out of insulator 804. Assembly 800 (and any other assemblies described herein) may include two ends (two ends of strut 802), wherein each of the two ends is identical, or similar, to one another and/or to those end conditions described in various portions of this description. Where assembly 800 includes isolators 806 at each end, each isolator 806 including containment elements 860, isolators 806 and containment elements 860 may constrain the axial/longitudinal motion of conductor wires 808 and thus constrain conductor wires 808 within insulator 804 at each end. Each containment element 860 may include a proximal end 862 configured to periodically contact conductor wire 808, such that proximal end 862 is that portion of containment element 860 that an end of conductor wire 808 contacts as conductor wire 808 moves longitudinally/axially.

At least one divider base 826 may include a divider base proximal end 827. Divider base proximal end 827 may at least partially engage a distal end 811 of insulator 804. Divider base proximal end 827 may be configured to prevent isolator 806 from extending past a desired point on insulator 804. Isolator 806 may partially slide over a distal end 811 of insulator 804, and divider base proximal end 827 may contact and may at least partially engage, or otherwise contact, distal end 811 to prevent isolator 806 from sliding past distal end 811 an undesirable distance. Isolator 806 may be configured to slide onto insulator 804 only far enough such that dividers 807 may extend between wire apertures 805, while an end block may extend into the remaining portion of isolator 806, with divider bases 826 preventing over-insertion of isolator 806 onto insulator 804.

The combination of divider 807, divider base 826, and containment element 860 may create a system of electrically insulative barriers between conductor wires 808, so as to maintain the electrical isolation distances between conductor wires 808. The maintaining of the electrical isolation distances between conductor wires 808 may prevent or mitigate the opportunity for electricity to arc between conductor wires 808 and create a short.

As discussed above, isolators 706 and 806 can be combined with an end block into a single unit. That is, the features, orientation, materials, and/or function of isolator 706 or 806 can be combined with the features, orientation, materials, and/or function of any of the end blocks described herein. In this manner, a combined isolator and end block may be formed as a single element, and this combined isolator and end block may perform the functions of isolator 706 and/or 806 and the end block.

In one embodiment a strut assembly is provided, the strut assembly comprising: a strut; an insulator; at least one conductor wire oriented within the insulator; an isolator; and an end block oriented within an end of the strut, the end block nesting within the strut. In one embodiment, the end block has a profile that is substantially similar to the interior profile of the strut. In one embodiment, the isolator is oriented between the end block and the strut. The strut may include an upper surface, lower surfaces, and sidewalls connecting the upper surface and the lower surfaces, and wherein the lower surfaces of the strut include a turnup creating a ledge. In one embodiment, the strut has a length L1, wherein the insulator has a length L2, and wherein the length L2 is less than the length L1. The insulator may include at least one wire aperture. The assembly may further comprise at least one conductor wire.

In one embodiment, a connector for connecting two strut assemblies is provided, the connector comprising: an upper housing having at least one U-shaped conductor element having vertical elements at opposing ends; a lower housing, the lower housing including: two lower housing wings, and rotatable locking cams oriented on each of the lower housing wings, the rotatable locking cams having two opposing flat sides and two opposing rounded ends. The upper housing may include a plurality of conductor collars, wherein the vertical elements of the conductor element extend through the conductor collars. The locking cam may be operatively connected to a locking element, and the locking element may include a knob. The lower housing wings may each include a wing aperture, wherein the locking cam connects to the locking element through the wing aperture. The locking element may include a locking element stop configured to constrain a rotational movement of the locking element and the locking cam. The connector may further comprise at least one biasing element that biases the conductor element in a direction away from the lower housing.

In one embodiment, a system including a series of strut assemblies joined by a connector is provided, the system comprising: two strut assemblies oriented end-to-end, each including: a strut; an insulator; at least one conductor wire oriented within the insulator; an isolator; and an end block oriented within an end of the strut, the end block nesting within the strut; a connector spanning a junction created by adjacent ends of the two strut assemblies, the connector including: an upper housing having at least one U-shaped conductor element having vertical elements at opposing ends; a lower housing, the lower housing including: two lower housing wings, and rotatable locking cams oriented on each of the lower housing wings, the rotatable locking cams having two opposing flat sides and two opposing rounded ends; wherein the locking cams are rotatable to engage the connector with each of the two strut assemblies. The end blocks of each of the two strut assemblies may form an adjacent pair of end blocks, and the connector may extend longitudinally beyond each end of the adjacent pair of end blocks. The strut may include an upper surface, lower surfaces, and sidewalls connecting the upper surface and the lower surfaces, and wherein the lower surfaces of the strut include a turnup creating a ledge. The locking cams may engage the ledge. The strut may have a length L1, wherein the insulator has a length L2, and wherein the length L2 is less than the length L1. The upper housing may include a plurality of conductor collars, and the vertical elements of the conductor element may extend through the conductor collars. The system may further comprise at least one biasing element that biases the conductor element in a direction away from the lower housing.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A strut assembly, comprising:
   a strut;
   an insulator having a distal end;
   at least one conductor wire oriented within the insulator;
   an end block oriented within an end of the strut, the end block nesting within the strut; and
   an isolator having dividers, each divider having a divider base with a divider base proximal end,
      wherein the divider base proximal end engages the distal end of the insulator and prevents the isolator from extending past a desired point on the insulator, and
      wherein the isolator is oriented between the end block and the strut such that the end block fits within the interior of the isolator.

2. The strut assembly of claim 1, wherein the end block has a profile that is substantially similar to the interior profile of the strut.

3. The strut assembly of claim 1, wherein the strut includes an upper surface, lower surfaces, and sidewalls connecting the upper surface and the lower surfaces, and wherein the lower surfaces of the strut include a turnup creating a ledge.

4. The strut assembly of claim 1, wherein the strut has a length L1, wherein the insulator has a length L2, and wherein the length L2 is less than the length L1.

5. The strut assembly of claim 1, wherein the insulator includes at least one wire aperture.

6. A strut assembly, comprising:
   a strut;
   an insulator having a distal end;
   an end block oriented within an end of the strut, the end block nesting within the strut;
   an isolator having dividers, each divider having a divider base with a divider base proximal end; and the isolator is oriented between the end block and the strut such that the end block fits within the interior of the isolator.

7. The strut assembly of claim 6, wherein the divider base proximal end engages the distal end of the insulator and prevents the isolator from extending past a desired point on the insulator.

8. The strut assembly of claim 6, wherein the end block has a profile that is substantially similar to the interior profile of the strut.

9. The strut assembly of claim 6, wherein the strut includes an upper surface, lower surfaces, and sidewalls connecting the upper surface and the lower surfaces, and wherein the lower surfaces of the strut include a turnup creating a ledge.

10. The strut assembly of claim 6, wherein the strut has a length L1, wherein the insulator has a length L2, and wherein the length L2 is less than the length L1.

11. The strut assembly of claim 6, wherein the insulator includes at least one wire aperture.

12. The strut assembly of claim 6, further comprising at least one conductor wire oriented within the insulator.

13. A strut assembly, comprising:
   a strut;
   an insulator having a distal end;
   an end block oriented within an end of the strut, the end block nesting within the strut; and
   an isolator having dividers, each divider having a divider base with a divider base proximal end,
      wherein the divider base proximal end engages the distal end of the insulator and prevents the isolator from extending past a desired point on the insulator.

14. The strut assembly of claim 13, wherein the isolator is oriented between the end block and the strut such that the end block fits within the interior of the isolator.

15. The strut assembly of claim 13, wherein the end block has a profile that is substantially similar to the interior profile of the strut.

16. The strut assembly of claim 13, wherein the strut includes an upper surface, lower surfaces, and sidewalls connecting the upper surface and the lower surfaces, and wherein the lower surfaces of the strut include a turnup creating a ledge.

17. The strut assembly of claim 13, wherein the strut has a length L1, wherein the insulator has a length L2, and wherein the length L2 is less than the length L1.

18. The strut assembly of claim 13, wherein the insulator includes at least one wire aperture.

19. The strut assembly of claim 13, further comprising at least one conductor wire oriented within the insulator.

* * * * *